United States Patent
Scheich et al.

(10) Patent No.: US 11,390,556 B2
(45) Date of Patent: Jul. 19, 2022

(54) DIFFUSER MATERIAL OF SYNTHETICALLY PRODUCED QUARTZ GLASS AND METHOD FOR THE MANUFACTURE OF A MOLDED BODY CONSISTING FULLY OR IN PART THEREOF

(71) Applicant: HERAEUS QUARZGLAS GMBH & CO. KG, Hanau (DE)

(72) Inventors: Gerrit Scheich, Seligenstadt (DE); Frank Nuernberg, Aschaffenburg (DE); Andreas Goetzendorfer, Aschaffenburg (DE); Nadine Tscholitsch, Hanau (DE); Bernhard Franz, Gießen (DE); Ursula Klett, Hanau (DE); Matthew Donelon, Round Rock, TX (US)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 244 days.

(21) Appl. No.: 16/077,005

(22) PCT Filed: Feb. 13, 2017

(86) PCT No.: PCT/EP2017/053126
§ 371 (c)(1),
(2) Date: Aug. 9, 2018

(87) PCT Pub. No.: WO2017/137618
PCT Pub. Date: Aug. 17, 2017

(65) Prior Publication Data
US 2019/0031555 A1    Jan. 31, 2019

(30) Foreign Application Priority Data

Feb. 12, 2016    (EP) ..................................... 16155505
Feb. 26, 2016    (EP) ..................................... 16157577

(51) Int. Cl.
*C03C 3/06*    (2006.01)
*C03B 19/06*    (2006.01)
(Continued)

(52) U.S. Cl.
CPC .............. *C03C 3/06* (2013.01); *C03B 19/066* (2013.01); *C03B 19/14* (2013.01); *C03C 11/00* (2013.01);
(Continued)

(58) Field of Classification Search
CPC ..... C03C 3/06; C03C 2203/54; C03B 19/066; C03B 2201/07; C03B 2201/80; C03B 2201/21; C03B 2201/23
See application file for complete search history.

(56) References Cited

U.S. PATENT DOCUMENTS 5,462,705 A    10/1995    Springsteen
5,674,792 A *  10/1997    Moritz ..................... B22C 9/12
                                                    501/133
(Continued)

FOREIGN PATENT DOCUMENTS

CN    1209420    3/1999
CN    1365343    8/2002
(Continued)

OTHER PUBLICATIONS

Dodd, D. M. and Fraser, D.B., "Optical Determinations of OH in Fused Silica", Journal of Applied Physics, vol. 37, pp. 3911-3913, 1966.
(Continued)

*Primary Examiner* — Noah S Wiese
(74) *Attorney, Agent, or Firm* — Stradley Ronon Stevens & Young, LLP (57) ABSTRACT

A diffuser material of synthetically produced, pore-containing quartz glass and a method for the manufacture of a
(Continued)

molded body consisting fully or in part thereof. The diffuser material has a chemical purity of at least 99.9% $SiO_2$, a cristobalite content of not more than 1%, and a density in the range of 2.0 to 2.18 $g/cm^3$. Starting therefrom, to indicate a diffuser material which is improved with respect to diffuse reflectivity with Lambertian behavior over a wide wavelength range, high material homogeneity and UV radiation resistance, the quartz glass has a hydroxyl group content in the range of at least 200 wt. ppm and at least 80% of the pores have a maximum pore dimension of less than 20 μm.

20 Claims, 4 Drawing Sheets (51) Int. Cl.
*C03B 19/14* (2006.01)
*C03C 11/00* (2006.01)
*C03B 19/12* (2006.01)

(52) U.S. Cl.
CPC .......... *C03B 19/12* (2013.01); *C03B 2201/07* (2013.01); *C03B 2201/21* (2013.01); *C03B 2201/23* (2013.01); *C03C 2201/21* (2013.01); *C03C 2201/23* (2013.01); *C03C 2201/80* (2013.01); *C03C 2203/54* (2013.01)

(56) References Cited

U.S. PATENT DOCUMENTS

| | | | |
|---|---|---|---|
| 5,983,673 A | | 11/1999 | Urano et al. |
| 7,074,731 B2 * | | 7/2006 | Ohama ................ C03B 19/095 117/200 |
| 2002/0082157 A1 | | 6/2002 | Yoshida et al. |
| 2003/0027705 A1 | | 2/2003 | Nishimura et al. |
| 2004/0025783 A1 * | | 2/2004 | Ohama ................ C03B 19/095 117/19 |
| 2007/0272685 A1 | | 11/2007 | Schreiber et al. |
| 2009/0266110 A1 | | 10/2009 | Werdecker et al. |
| 2010/0316858 A1 | | 12/2010 | Sato et al. |
| 2011/0256330 A1 * | | 10/2011 | Yamagata ............... C01B 33/12 428/34.6 |
| 2013/0105744 A1 * | | 5/2013 | Ogawa ................... C03B 32/00 252/587 |
| 2015/0132511 A1 | | 5/2015 | Scheich et al. |
| 2016/0002092 A1 | | 1/2016 | Kuehn |
| 2016/0032483 A1 | | 2/2016 | Schenk et al. |

FOREIGN PATENT DOCUMENTS

| | | |
|---|---|---|
| CN | 1968903 | 5/2007 |
| CN | 104995145 | 10/2015 |
| DE | 10243953 | 4/2004 |
| EP | 2982780 | 2/2016 |
| WO | 2008/040615 | 4/2008 |
| WO | 2015/067688 | 5/2015 |

OTHER PUBLICATIONS

International Search Report and Written Opinion for counterpart international patent application No. PCT/EP2017/053126 dated Mar. 13, 2017 by the European Patent Office as International Searching Authority.
Khotimchenko, V.S. et al., "Determining the Content of Hydrogen Dissolved in Quartz Glass Using the Methods of Raman Scattering and Mass Spectrometry" J Appl Spectrosc (1987) 46: 632-635 , (translated from Zhumal Prikladnoi Spektroskopii, vol. 46, No. 6, pp. 987-991, Jun. 1987) https://doi.org/10.1007/BF00661243.
Mason, John D. et al, "Robust Commercial Diffuse Reflector for UV-VIS-NIR Applications", Applied Optics, vol. 54, No. 25, pp. 7542-7545 Sep. 1, 2015 DOI: 10.1364/AO.54.007542, ISSN 0003-6935, (Aug. 25, 2015), URL: http://dx.doi.org/10.1364/A0.54. 007542, XP055273539.
Search Report dated Jul. 5, 2016 by the European Patent Office for priority EP Application No. 16157577.4.
Chinese Office Action dated Nov. 26, 2020 for Chinese Patent Application No. 201780010996.6.

* cited by examiner

DIFFUSER MATERIAL OF SYNTHETICALLY PRODUCED QUARTZ GLASS AND METHOD FOR THE MANUFACTURE OF A MOLDED BODY CONSISTING FULLY OR IN PART THEREOF

RELATED APPLICATIONS

This application is a U.S. national phase application of International Patent Application No. PCT/EP2017/053126 filed on Feb. 13, 2017 and published as international Publication No. WO 2017/137618 on Aug. 17, 2017. This application claims the benefit of priority to Patent Application No. 16155505.7 filed in Europe on Feb. 12, 2016, and to Patent Application No. 16157577.4 filed in Europe on Feb. 26, 2016, the contents of which are incorporated in this application by reference.

TECHNICAL FIELD

The present invention refers to a diffuser material of synthetically produced, pore-containing quartz glass with a chemical purity of at least 99.9% $SiO_2$, a cristobalite content of not more than 1%, and a density in the range of 2.0 to 2.18 $g/cm^3$.

Furthermore, the invention is concerned with a method for producing a molded body consisting at least in part of a diffuser material of synthetically produced quartz glass in that a green body is produced from a slurry containing a dispersion liquid and synthetically produced $SiO_2$ powder particles with a purity of at least 99.9% $SiO_2$, and the green body is processed by sintering into the diffuser material.

Diffuser materials are used as solid bodies or coatings in optical components for providing a uniform diffuse illumination. The ideally diffusely reflecting surface is non-specular and reflects optical radiation according to Lambert's law. Said law describes the decrease in radiation intensity with the beam angle becoming flatter, resulting in a circular distribution of the radiation intensity at a constant radiation density over the surface.

BACKGROUND OF THE INVENTION

"Spectralon" (trade name of the company Labsphere, Inc.) forms an industrial standard in this respect. This material is for instance used as a reflection standard in calibration patterns, integrating spheres and lasers. Manufacture and properties are described in U.S. Pat. No. 5,462,705 A. It consists of sintered polytetrafluoroethylene (PTFE) which forms a porous network of molecule chains. The porous structure creates multiple internal reflections on the surface and within a thin layer below said surface, so that light impinging on the surface is diffusely reflected. "Spectralon" shows a flat spectral profile at a reflectivity of more than 99% and Lambertian reflection behavior over a wide wavelength range from infrared down into wavelengths of about 300 nm.

However, the optical properties of the plastic material are changing in the course of time, so that recalibrating operations are often required in measurement applications. Due to its low density in the range of 1.25-1.5 $g/cm^3$ "Spectralon" has a low mechanical stability, and its temperature stability is also just enough for applications at temperatures of not more than about 400° C.

A mechanically and thermally more stable diffuser material of synthetically produced quartz glass according to the above-named type avoids part of said drawbacks, as described in the paper by John D. Mason et al., "A new Robust Commercial Diffuse Reflector for UV-VIS Applications," Journal Applied Optics, Vol. 54 (25); 25.08.15; Journal ID: ISSN 0003-6935; http://dx.doi.org/10.1364/AO.54.007542. The diffuser material of synthetically produced quartz glass, called "HOD-300", contains multiple pores with pore dimensions in the range of 1 μm to 10 μm, and it can be machined. In the wavelength range of 250 nm to about 1100 nm it shows a constant high reflectivity of much more than 99%. This paper does not explain the manufacture of the diffuser material from synthetic quartz glass.

The generic manufacturing method for opaque synthetic quartz glass is known from DE 102 43 953 A1. The starting material used are $SiO_2$ granules of porous $SiO_2$ granulate particles obtained by using nanoscale, amorphous, synthetically produced $SiO_2$ primary particles by using roll type granulating methods. The sizes of the granulate particles are between 100 μm and 500 μm. Thermally solidified porous "fine granules" are produced from these raw granules by treatment in a rotary furnace at a temperature of 1200° C. in chlorine-containing atmosphere, and completely vitrified synthetic quartz-glass grains are produced in a part thereof by heating to a temperature of 1450° C. The particles of the fine granules and of the quartz glass grains have a mean size (median or D50 value) of less than 160 μm. The D50 value represents the particle size that is not reached by 50% of the cumulative particle volume.

A preparation of a 50:50 mixture of $SiO_2$ fine granules and quartz glass grains is stirred into deionized water. The dispersion is homogenized in a polyurethane-lined ball mill for about one hour and is subsequently cast into a porous plastic mold in which dehydration and shell formation take place to form an open-pored green body. It is already in the drying process that a firm bond is established between the individual granulate particles and the green body is densified and consolidated, which facilitates subsequent sintering into the opaque quartz glass. The specific densities achieved therein are in the range of 2.10 $g/cm^3$ to 2.18 $g/cm^3$.

In a modification of this procedure, according to WO 2008/040615 A1, and instead of thermally densified $SiO_2$ granular grains as the starting material for the aqueous dispersion, use is made of a mixture of $SiO_2$ nanoparticles and spherical particles of synthetically produced quartz glass with a $SiO_2$ content of at least 99% by wt. The spherical quartz glass particles exhibit a multimodal particle size distribution with a first maximum of the size distribution in the range of 1 μm and 3 μm and a second maximum in the range of 5 μm to 50 μm. For instance, particle distributions with $D_{50}$ values of 2, 5, 15, 30 and 40 μm can be used. The solids content of the dispersion (weight percentage of the spherical $SiO_2$ particles and the $SiO_2$ nanoparticles together) is between 83% and 90%. The multimodal particle size distribution of the amorphous $SiO_2$ particles and the high solids content lead to a uniform and low shrinkage of the dispersion after mold casting, which is promoted by the addition of $SiO_2$ nanoparticles, in that this addition even intensifies the interactions between the amorphous $SiO_2$ particles, as have already been explained above.

To produce an optically homogeneous and esthetically appealing reflector layer of opaque quartz glass, the dispersion is uniformly distributed by using a doctor blade device on the curved surface of a lamp tube. The reflector layer obtained after drying and sintering in a sintering furnace at 1280° C. and during a sintering period of 3 h in air shows a hemispherical reflectivity (determined by means of an integrating sphere) with an approximately uniform reflectance of about 95% (based on the reflectivity of "Spectralon") at a thickness of 0.8 mm in the wavelength range of 300-2100 nm. At a wavelength of 210 nm the reflectance is even higher than 98%.

SUMMARY OF THE INVENTION

On account of the said typical properties, synthetically produced opaque quartz glass is in principle predestined as a diffuser material for a spectral optical diffuser when high corrosive, mechanical and thermal loads or stresses have to be expected during use. However, besides the Lambertian behavior, material homogeneity and, in some applications, also resistance to UV radiation are important material parameters for a high-quality diffuser. These demands are not adequately met by the formerly known diffuser materials of opaque synthetic quartz glass.

It is therefore the object of the present invention to provide a diffuser material that in comparison with the known, synthetically produced, opaque quartz glasses is distinguished not only by diffuse reflectivity with Lambertian behavior over a wide wavelength range, but also by its material homogeneity and UV radiation resistance.

Moreover, it is the object of the present invention to indicate a method that allows a reproducible manufacture of such a diffuser material.

As for the diffuser material, this object starting from the material of the above-mentioned type is achieved according to the invention in that the quartz glass has a hydroxyl group content in the range of at least 200 wt. ppm and that at least 80% of the pores have a maximum pore dimension of less than 20 µm.

BRIEF DESCRIPTION OF THE DRAWING

The invention will now be explained in more detail with reference to embodiments and a drawing, in which.

DETAILED DESCRIPTION OF THE INVENTION

The diffuser material according to the invention is suited as a diffuser to be used both for diffuse reflection of the impinging radiation (hereinafter designated as reflection mode) and as a diffuse radiator in the transmission of the radiation (hereinafter called transmission mode).

In the transmission mode, the transmitted light quantity is detected for instance by way of the integrating-sphere (Ulbricht-sphere) measurement principle at room temperature as directional-hemispherical transmittance. In opaque material this factor strongly depends on the thickness through which radiation is passed. Hence, in the reflection mode the reflected light quantity is typically determined as directional-hemispherical reflectance by means of the integrating sphere.

The diffuser material according to the invention consists of synthetically produced quartz glass. Synthetic quartz glass is characterized by high purity and in case of transparency by a high direct transmission for optical radiation over a wide wavelength range, also for UV radiation with wavelengths of less than 300 nm. In the diffuser material according to the invention, direct transmission is reduced by the porosity of the quartz glass. Nevertheless, the low intrinsic absorption promotes the efficiency of the scattering behavior and thus the diffuse reflection and the diffuse transmission, especially in the UV wavelength range.

The synthetic quartz glass is produced by using a synthetically produced silicon-containing starting material. It is of high purity in the sense that the main component is $SiO_2$ and undesired impurities are at the most contained in the sub-ppm range.

By comparison with a quartz glass fused from naturally occurring $SiO_2$ raw material, synthetically produced quartz glass is less prone to solarization and exhibits higher resistance to high-energy UV radiation. To achieve a further improvement in the resistance to UV radiation, the synthetic quartz glass contains hydroxyl groups in a concentration of 200 wt. ppm or more and preferably in the range of 450+/−50 wt. ppm. Hydroxyl groups achieve a decrease in the viscosity of quartz glass. Hydroxyl groups are therefore undesired with respect to high dimensional stability upon thermal load on the quartz glass component. It has however been found that hydroxyl groups in the specified concentration give the diffuser material enhanced radiation resistance to UV radiation. A hydroxyl group content of more than 500 wt. ppm is however not preferred.

The opacity of the diffuser material is determined by the number, size and shape of the pores. These act in the quartz glass matrix as optical defects and have the effect that the diffuser material appears to be opaque-translucent or non-transparent, depending on the layer thickness. The pores are as small as possible and are evenly distributed in the quartz-glass diffuser material. At least 80% of the pores have a pore size of less than 20 µm, preferably less than 15 µm, and particularly less than 10 µm. The said pore percentage of 80% refers only to pores with a pore size of more than 1 µm. The pores preferably have a non-spherical shape with bulges. This will be explained in more detail further below on the basis of the description of the method according to the invention. These irregular shapes contribute to a more efficient light scattering within the diffuser material. The pore size is the maximum distance between two opposite pore walls of a pore. This maximum distance is determined by way of microscopic image analysis by analogy with the so-called "Feret diameter" of particles, as defined in the standard DIN 66141 and ISO-13322-2. The opaque quartz glass according to the invention is characterized by diffuse reflectivity or diffuse transmissivity with Lambertian behavior over a great wavelength range between 250 nm and 2500 nm. The diffuser material is comparatively stable mechanically and thermally and is gas-tight, i.e. shows no open porosity. It may be present as a diffusely reflecting or transmitting component or as a layer on a substrate, and it is also suited for applications which require high thermal and chemical stability and high resistance to gases and liquids with an etching action.

The degree of the diffuse scattering on pores depends on size and number of the pores. In this respect it has turned out to be useful when the pore volume is in the range of 0.9% to 5% and is here preferably more than 2.5%.

The "pore volume" of a porous material designates the free volume occupied by cavities or voids within the material. The pore volume is determined with the help of a density measurement.

As for a uniform pore distribution and high homogeneity of the scattering properties, a diffuser material has turned out to be useful with a homogeneous density distribution in the sense that five density measurement samples that are uniformly distributed over a measurement length of 5 cm and have a sample volume of 1 cm$^3$ exhibit a specific density range of less than 0.01 g/cm$^3$.

The quartz glass of the diffuser material according to the invention has preferably a total impurity content of Li, Na, K, Mg, Ca, Fe, Cu, Cr, Mn, Ti, Al, Zr, Ni, Mo and W of not more than 0.5 wt. ppm.

The synthetic quartz glass guarantees high chemical purity with a SiO$_2$ content of at least 99.9% by wt. of SiO$_2$, preferably at least 99.99% by wt. of SiO$_2$, so that optical absorption by impurity atoms is minimized and absorption in the deep UV range is in particular reduced.

The scattering properties and the opacity of the diffuser material are influenced by the difference of the refractive indices of pores and quartz glass matrix. The higher this refractive index difference, the higher is the degree of scattering and opacity. The refractive index of the pores depends on whether a vacuum prevails therein or whether a gas is contained, and possibly on the type of gas. The gas may be oxygen, nitrogen, argon, helium or hydrogen or mixtures thereof, such as for instance air. In a particularly preferred embodiment of the diffuser material according to the invention, however, the pores contain neon.

Neon gas has a low refractive index by comparison with other gases. It is true that the refractive index of helium or hydrogen is even lower. However, on account of their high diffusivity and solubility in quartz glass, these gases can escape out of the pores, so that the pores collapse during sintering. This also happens with pores under vacuum. Neon is the gas with the lowest refractive index that does not dissolve in quartz glass. Therefore, the neon-containing pores have a low refractive index and they do also not disappear during sintering. Ideally, the total gas content in the pores is neon; a significant impact on opacity is however already achieved when the neon gas amount is at least 5 vol. % (based on the total gas volume in the pores). Preferably, it is at least 30 vol. % and particularly preferably at least 50 vol. %.

Especially with respect to high UV radiation resistance, the quartz glass contains hydrogen preferably in a concentration ranging from $10^{17}$ molecules/cm$^3$ to $10^{19}$ molecules/cm$^3$.

Hydrogen is capable of healing structural defects in the quartz glass network that might be caused by the exposure of the diffuser material to short-wave, high-energy UV radiation. This is noticeable in a better long-term stability of the diffuser material according to the invention. The hydrogen loading suited therefor depends on the specific application conditions, particularly the radiation dose. At concentrations of less than $10^{17}$ molecules/cm$^3$, the defect-healing effect is small; concentrations of more than $10^{19}$ molecules/cm$^3$ are difficult to prepare.

The diffuser material according to the invention is for instance used as a diffuser in spectroscopy and space applications, as a densitometer standard, for remote sensing targets, for diffusely reflecting laser cavities and reflectors, in integrating spheres or as cladding material for light sources. It is also suited as a diffuser for applications at high temperatures of more than 400° C.

As for the method according to the invention for producing a molded body which consists of the diffuser material according to the invention or contains said diffuser material, the above-mentioned object starting from a method of the aforementioned type is achieved according to the invention by a method comprising the following method steps:

(a) comminuting a starting material of synthetically produced quartz glass with a hydroxyl group content of at least 200 wt. ppm to obtain SiO$_2$ grains, (b) wet grinding the SiO$_2$ grains in the dispersion liquid to form the slurry of the dispersion liquid and SiO$_2$ particles, of which the majority has a size of less than 10 μm, and (c) forming the slurry into the green body of the SiO$_2$ particles.

The method according to the invention comprises a slurry method in which an intermediate product preceding the molded body is obtained in the form of a porous green body. Both the slurry method itself and the intermediate state in the green body allow measures for setting and changing properties with impacts on the final diffuser material. The method according to the invention differs from the procedure known from the prior art substantially in the type of the starting material used.

According to method step (a) a starting material of synthetically produced transparent quartz glass is comminuted.

Synthetic transparent quartz glass is obtained for instance by flame hydrolysis or oxidation of synthetically produced silicon compounds, by polycondensation of organic silicon compounds according to the so-called sol-gel method, or by hydrolysis and precipitation of inorganic silicon compounds in a liquid. In the industrial manufacture of synthetic quartz glass one obtains SiO$_2$-rich primary particles and also so-called soot or filter dust. These dusts can be sintered or molten after pre-densification by granulation also into synthetic transparent quartz glass. Examples of suitable buildup or press granulation methods are rolling granulation in a dish granulator, spray granulation, centrifugal atomization, fluidized-bed granulation, granulation methods using a granulating mill, compaction, roller pressing, briquetting, flake production or extrusion.

The synthetic transparent quartz glass is dense and is characterized by a high purity. Undesired impurities are contained in the sub-ppm range at the most. Preferably, the total impurity content of Li, Na, K, Mg, Ca, Fe, Cu, Cr, Mn, Ti, Al, Zr, Ni, Mo and W is not more than 0.5 wt. ppm.

The production of the synthetic transparent quartz glass as the starting material for the preparation of the slurry entails high material expenditure and costs. Nevertheless, the method according to the invention includes the comminution of the quartz glass into synthetic SiO$_2$ grains. The surface of the fractured areas created during comminution is comparatively reactive, which can contribute to the preparation of a stable slurry in subsequent processing steps.

This particularly regards also the further milling of the SiO$_2$ grains within the dispersion liquid. In the course of the grinding and homogenizing process the dispersion liquid can change the freshly produced reactive surfaces of the particles and particularly cause interactions between them, which in the subsequent sintering process can contribute to a denser and more stable bond. In dispersions based on alcohol or water, the polar nature of the dispersion can even intensify said interactions between the particles, which can facilitate drying and sintering of the green body.

A synthetic transparent quartz glass is used that contains hydroxyl groups in a concentration of 200 wt. ppm or more and preferably in the range of 450+/−50 wt. ppm. Hydroxyl groups in the specified concentration give the diffuser material a higher radiation resistance to UV radiation. A starting material of quartz glass with a hydroxyl group content of more than 500 wt. ppm is however not preferred.

Both in the comminution of the starting material according to method step (a) and in the wet grinding of the SiO$_2$ grains in method step (b), fractured surfaces and fragments are produced that normally have not a spherical, but a non-spherical, rugged, splintery morphology. In the green body, these SiO$_2$ particles interlock with one another, resulting in a high density and strength of the green body. This facilitates sintering which can therefore be carried out at a comparatively low temperature of less than 1400° C.

The pores are created during sintering of the green body into the diffuser material, or they are maintained after sintering as residues of existing, rather large voids. The number and size of the pores in the diffuser material depends on the sintering temperature and duration, but mainly also on the type of the SiO$_2$ grains of which the green body is built up. In contrast to the aforementioned prior art, in which the green body is produced from SiO$_2$ granulate particles or dense SiO$_2$ particles with a more or less spherical morphology, the green body in the method of the invention is built up of comminuted and ground SiO$_2$ grains. This yields comparatively irregularly shaped voids of different sizes in the green body. The pores remaining after the sintering of such a green body are therefore also irregularly shaped due to the manufacturing process, and they are particularly distinguished by outwardly oriented angular bulges that efficiently influence the scattering behavior of the diffuser material.

As a rule, the green body already has a form which is close to the final contour of the diffuser to be produced (or to the shape of the diffuser material as part of a molded body). This is for instance a massive solid body, a hollow body or a layer on a substrate. The green body can be obtained by casting the suspension into a mold. Other processing methods are however also suited for the suspension, for instance sucking into a mold, immersion, injection, dispersion coating, filling, dressing, troweling, doctor-blade application, or the like.

The green body is dried and sintered into a gas-tight, mechanically stable blank. The intensity of the sintering process is here chosen such that the surface does not melt on the one hand, but a blank density which is as high as possible is achieved on the other hand. The parameters suited for sintering (sintering temperature, sintering duration, atmosphere) can be determined in simple tests.

As for a diffuser material which has neon-containing pores, sintering is preferably carried out in an atmosphere containing neon.

When sintering is carried out in a neon-containing atmosphere, the pores close at a temperature of around 1375° C., and the neon gas is entrapped at that temperature. The refractive index of the pore ensues from the partial pressure of neon at room temperature which is at any rate below atmosphere. As already explained above with reference to the diffuser material, the neon gas is the gas with the lowest refractive index that does not disappear from the pores during sintering. The neon-containing pores therefore have a comparatively low refractive index. Ideally, the sintering atmosphere consists of 100% neon. However, a significant impact on opacity is already achieved when the neon gas content in the atmosphere is at least 5 vol. % during sintering; preferably, it is at least 30 vol. % and most preferably it is at least 50 vol. %.

The blank obtained after sintering is present as a layer on a substrate or as a massive component. In possible after-treatments, such as thermal treatment, hydrogen loading or mechanical treatment, it forms the molded body on condition that the body consists completely of the diffuser material, or forms part of the molded body if said body consists only in part of the diffuser material.

The pores contained in the blank act in the quartz-glass matrix as optical defects and have the consequence that the diffuser material appears to be nontransparent-opaque or translucent, depending on the material thickness. The pores are as small as possible and are uniformly distributed in the quartz-glass diffuser material. At least 80% of the pores have a maximum pore dimension of less than 20 µm, preferably less than 15 µm, and particularly preferably less than 10 µm. The said pore amount of 80% refers only to pores with a pore size of more than 1 µm. A component consisting completely of the diffuser material is produced from the blank by mechanical treatment such as cutting, milling, drilling, grinding, or the like, or for instance a diffusely scattering reflector layer on a substrate as part of a molded body (in the form of a reflector).

When components that decompose during sintering are added to the slurry, the porosity of the diffuser material can additionally be influenced after sintering.

During sintering of the green body, the reflectivity thereof is considerably decreasing. The result of the sintering process is a pore-containing, but gas-tight (closed-pore) blank. It has turned out to be advantageous when the quartz glass is just dense-sintered and an open porosity no longer exists. Essential parameters are sintering duration and sintering temperature. In the method according to the invention a low sintering temperature below 1,400° C. is particularly advantageous.

Hydrogen can saturate defects in the network structure of quartz glass and improve the radiation resistance of the glass to UV radiation. In this respect it has turned out to be useful when the blank is treated for loading of the opaque quartz glass with hydrogen at a pressure of at least 1 bar and at a temperature of less than 500° C. in a hydrogen-containing atmosphere.

The purity of the diffuser material and its hydroxyl group content depend substantially on the semifinished product in the form of the blank and thus on the starting material. With respect to this, preferably a starting material is used that at a wavelength of 1064 nm has an absorption coefficient of 10 ppm/cm or less, and at a wavelength of 946 nm an absorption coefficient of 2000 ppm/cm or less.

The wavelengths 946 and 1064 nm are typical emission lines of an Nd:YAG laser. Absorption at the wavelength of around 1064 nm is typical of metallic impurities. The high purity of the synthetic quartz glass as the starting material is expressed in a low absorption coefficient of 10 ppm/cm at that wavelength. This is a precondition for a high-purity diffuser material. By contrast, absorption at the wavelength of about 946 nm is typical of hydroxyl groups in quartz glass. An absorption coefficient of 2000 ppm/cm or less is an indication of a medium hydroxyl group content. Preferably, however, the absorption coefficient at this wavelength should not be less than 1500 ppm/cm.

Moreover, in the method according to the invention a starting material is preferably used that at the wavelength of 200 nm has an extinction coefficient k200 of less than $5 \times 10^{-3}$ cm'.

The k value is the decadic extinction coefficient (constant k) in the following equation:

$$\frac{I}{I_0} = (1 - R)^2 \times 10^{-kd}$$

(I=transmitted intensity, $I_0$=incident intensity, d=sample thickness, R=reflectivity of the sample surface).

The k200 value designates the material-specific extinction coefficient for the UV wavelength 200 nm. The equation links the measured transmission $I/I_0$ with a material property, the extinction. It includes both the absorption of the material and the scattering of the light in the material volume.

The expression $(1-R)^2$ describes the reflection losses on both surfaces of the measurement sample (on the assumption of ideal surfaces which as such do not scatter or absorb). If volume scattering is very small, the k value substantially describes the absorption of the material. If impurities are the main factor for the absorption, as is typically the case at the wavelength of 200 nm, a small k value is an indirect measure of the purity of the quartz glass.

Example

Figure 1:
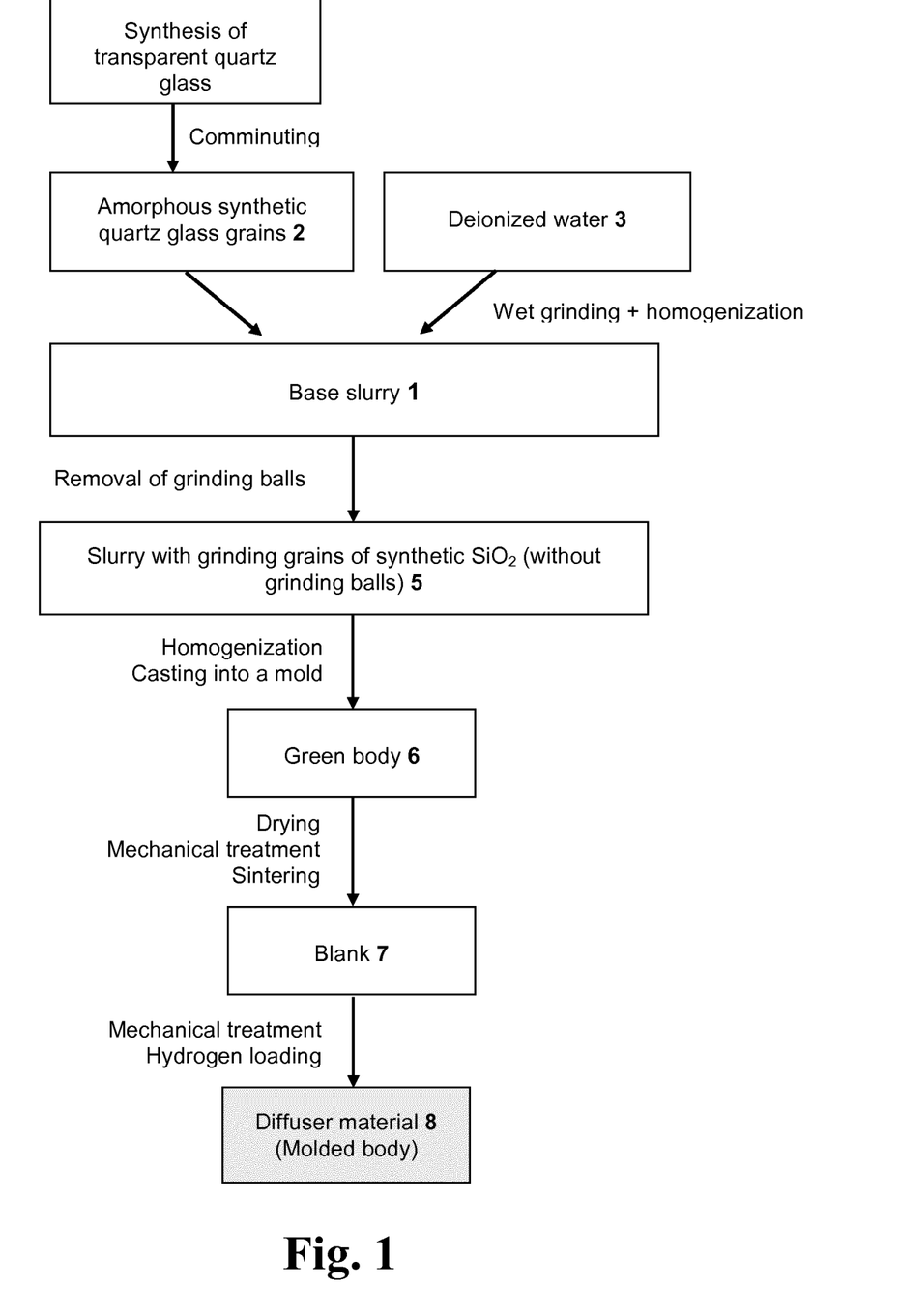
FIG. 1 shows a flow diagram for explaining the manufacture of an embodiment of the inventive diffuser material according to the invention.

The method according to the invention will now be explained in an exemplary manner with reference to the manufacture of a plate-shaped diffuser of quartz glass for use in a spectroscope for measuring properties of the earth's atmosphere in the wavelength range of 250-800 nm on the basis of FIG. 1.

Preparation of Grains of Synthetically Produced Quartz Glass

A cylinder of transparent quartz glass with a hydroxyl group content of 450 wt. ppm is produced in the standard way by flame hydrolysis of $SiCl_4$. Transmission and reflection values in the wavelength range of 200-2500 nm were determined by way of a spectrometer (Perkin Elmer Lamda900/950) on a measurement sample polished on both sides and consisting of the synthetic quartz glass.

On the basis of the measurement data, an absorption coefficient of 5 ppm/cm was determined for the wavelength of 1064 nm, and an absorption coefficient of 1800 ppm/cm for the wavelength of 946 nm. The k200 value of the synthetic quartz glass is less than $3 \times 10^{-3}$ cm$^{-1}$.

Preparation of a $SiO_2$ Slurry

For the preparation of granular, broken starting material, the quartz glass cylinder of synthetic quartz glass is milled and the size fraction of the amorphous quartz glass fragments 2 with grain sizes in the range between 250 μm and 650 μm is extracted by sieving.

For a batch of 10 kg of slurry 1 ($SiO_2$-water-slurry), 8.2 kg of the amorphous synthetic quartz glass grains 2 are mixed with 1.8 kg deionized water 3 with a conductivity of less than 3 μS in a quartz glass-lined drum mill with a volume content of about 20 liters. This mixture is ground by means of grinding balls of quartz glass on a roller block at 23 rpm for a period of 7 days to such an extent that a homogeneous base slurry 1 with a solids content of 78% is formed. During wet grinding the quartz glass grains are further comminuted, resulting in a decrease of the pH to about 4 due to the dissolving $SiO_2$.

Subsequently, the grinding balls are removed from the slurry 1 obtained thereby and the slurry is homogenized for another 12 hours. The quartz glass grains used are ground into fine $SiO_2$ particles with a particle size distribution which is characterized by a $D_{90}$ value of about 40 μm and a $D_{50}$ value of 10 μm.

Preparation of a Green Body and of a Porous $SiO_2$ Blank

The slurry 5 is cast into a die of a commercial die-casting machine and dewatered through a porous plastic membrane to form a porous green body 6. The green body 6 has the shape of a plate with an outer diameter of 380 nm and a thickness of 40 mm.

For the removal of bound water, the green body 6 is dried in a ventilated furnace at about 90° C. for five days and, after cooling, the resulting, still porous green body 6 is mechanically treated almost to the final dimension of the quartz-glass diffuser plate 8 to be produced.

Preparation of a Molded Body of Opaque Synthetic Quartz Glass

For sintering the green body 6 said body is heated up in a sintering furnace in air within one hour to a heating temperature of 1395° C. and held at that temperature for 1 h. Cooling is carried out with a cooling ramp of 1° C./min to a furnace temperature of 1000° C. and subsequently in an uncontrolled manner in the closed state of the furnace.

In an alternative method, the green body 6 is sintered to a temperature of 1395° C. in a closed sintering furnace in a neon atmosphere (about 100% neon). After a heating period of 1 hour the pores have closed and the material is cooled to a furnace temperature of 1000° C. at a cooling rate of 1° C./min and with subsequent free cooling to room temperature. The diffuser material obtained in this way contains closed pores with an internal pressure which is below atmospheric pressure and is defined almost entirely by neon gas.

The blank 7 obtained in this way consists of synthetic quartz glass having no longer any open pores. For loading with hydrogen the blank 7 is hydrogen-loaded together with the reference sample of transparent quartz glass with the same dimensions as the blank 7 at 400° C. in pure hydrogen and at a pressure of 1 bar for 4 h. A comparative sample remained without this hydrogen loading.

Diffusor plates 8 were cut out from the blank 7 and ground. In this case the diffuser plate 8 forms a molded body (8) according to the invention which consists completely of the diffuser material.

Material Properties

The diffuser material/the molded body 8 consists of a gas-tight, closed-pore, opaque quartz glass with a hydroxyl group content of 450 wt. ppm, a mean loading with hydrogen of $3 \times 10^{17}$ molecules/cm$^3$ and a density of 2.145 g/cm$^3$. The plate diameter is 80 mm and the plate thickness is 5 mm.

The hydroxyl group content is determined by infrared spectroscopy with the help of the method of D. M. Dodd & D. M. Fraser, published in "Optical Determinations of OH in Fused Silica," J. A. P. 37, 3991 (1966). Instead of the spectrometer indicated there, use is made of an FTIR spectrometer. The absorption band at about 3670 cm$^{-1}$ is evaluated; at a high hydroxyl group content the absorption band is about 7200 cm$^{-1}$. Since internal reflections that might distort the absolute value arise in diffuse materials, all measurements are carried out on sample discs with a thickness of 3 mm for reasons of comparability.

On the reference sample of the hydrogen loading process, the hydrogen content ($H_2$ content) is determined on the basis of a Raman measurement which has been suggested by Khotimchenko et al., "Determining the Content of Hydrogen Dissolved in Quartz Glass Using the Methods of Raman Scattering and Mass Spectrometry," Zhurnal Prikladnoi Spektroskopii, Vol. 46, No. 6 (June 1987), pp. 987-991.

The diffuser material shows a total impurity content of Li, Na, K, Mg, Ca, Fe, Cu, Cr, Mn, Ti, Al, Zr, Ni, Mo and W of 0.4 wt. ppm. The said impurities are determined by means of ICP-OES or ICP-MS methods.

Figure 2:
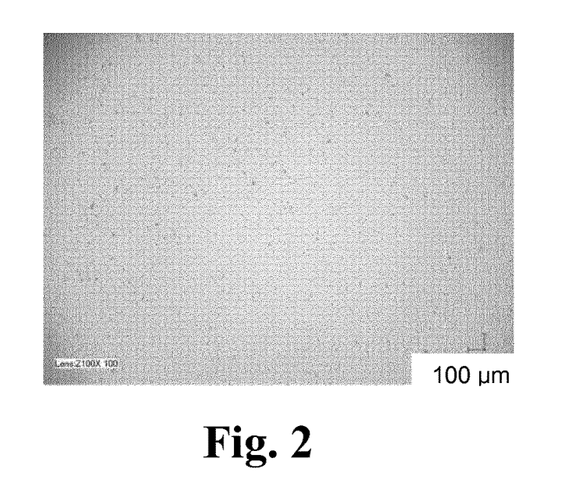
FIG. 2 is a microscopic image of the surface of the diffuser material.

Visually, the surface seems to be white and matte. A multitude of finely distributed pores 31 are visible under the microscope on the ground surface in FIG. 2. The total porosity of the diffuser material is about 2.5%. The pores have maximum dimensions of less than 20 μm; on average (median value) the maximum dimensions are about 5 μm.

Since the diffuser material according to the invention shows no open porosity, a simple density measurement according to the Archimedean principle is possible. The porosity is determined on the basis of the density measurement in consideration of the specific density of transparent quartz glass; it is about 2.2 g/cm$^3$.

To check the homogeneity of the density distribution, five samples with a volume of 1 cm$^3$ each were taken from different areas of the diffuser plate 8 and the density was determined on said samples. The range of the density measurement samples around the mean density of 2.145 g/cm$^3$ is less than 0.01 g/cm$^3$.

Figure 3:
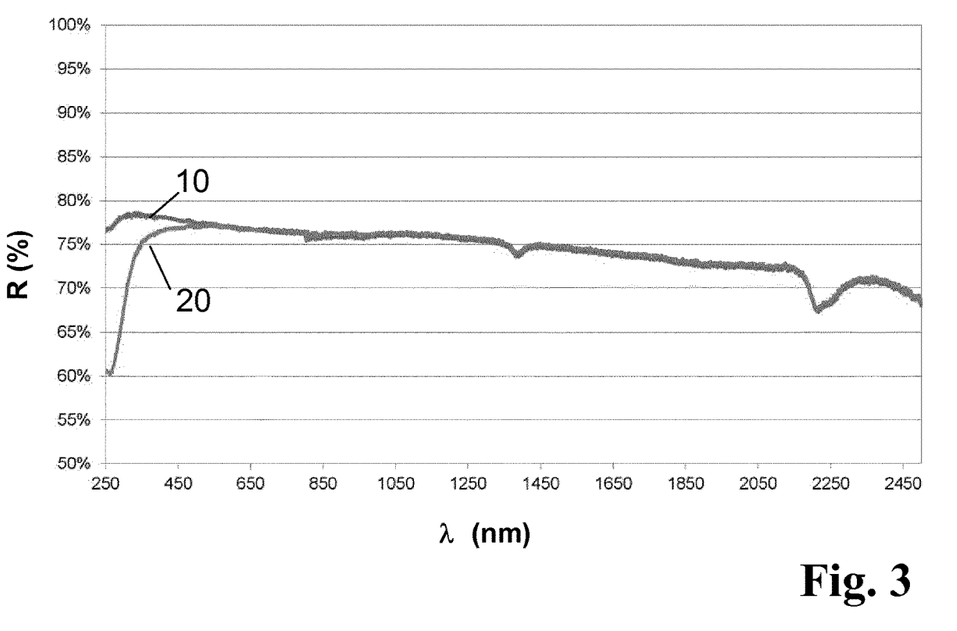
FIGS. 3 to 6 show diagrams on the spectral reflection and transmission behavior of the diffusor.
Figure 4:
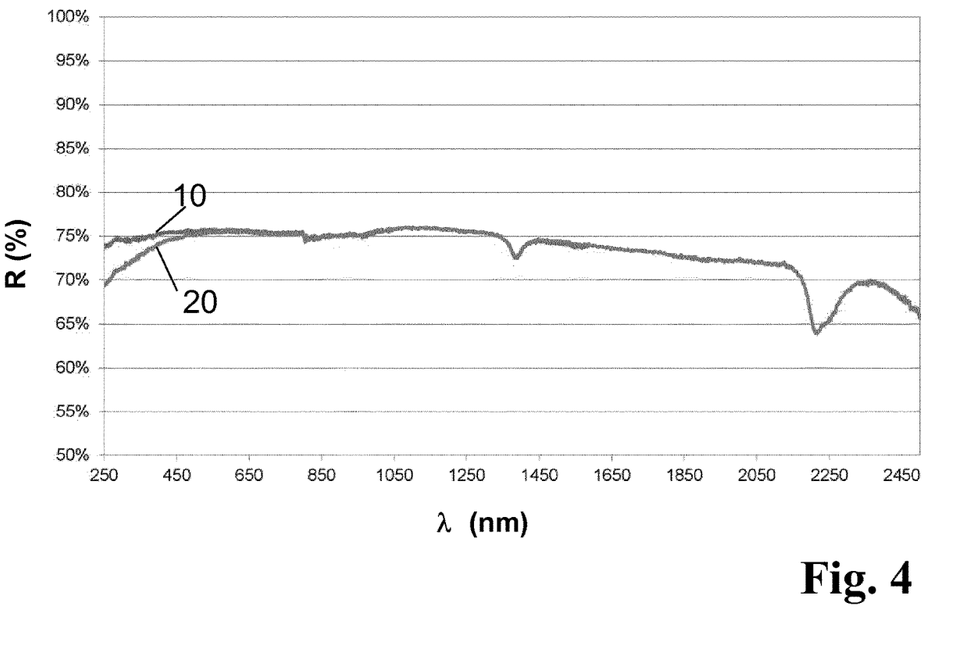

The diagrams of FIGS. 3 and 4 show the directional-hemispherical reflectance R (in %) measured in the standard way by means of an integrating sphere on the diffuser plate 8 (thickness: 5 mm), against the wavelength range of 250 nm to 2500 nm.

Figure 5:
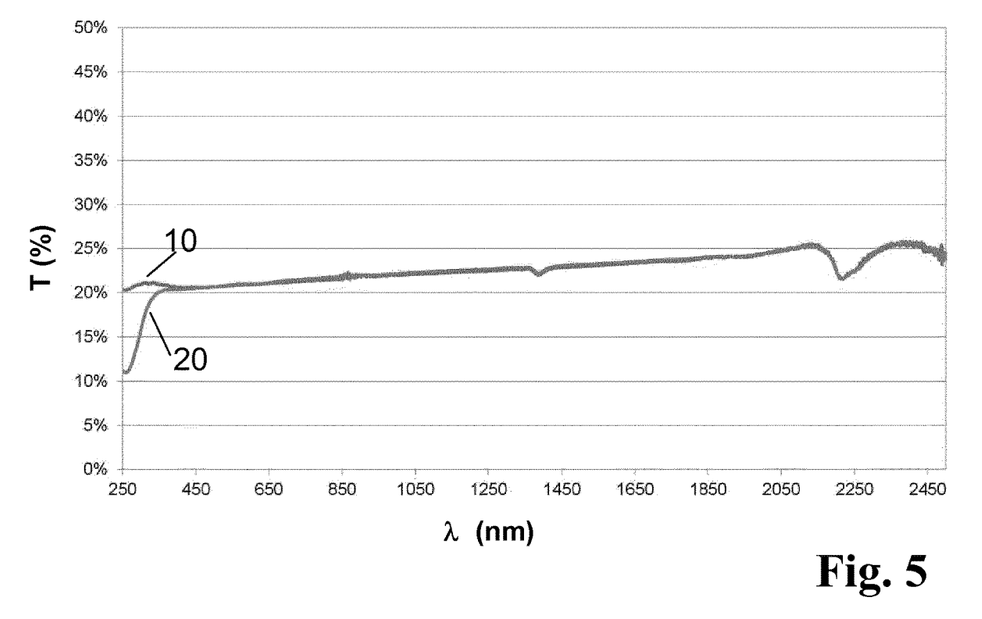
Figure 6:
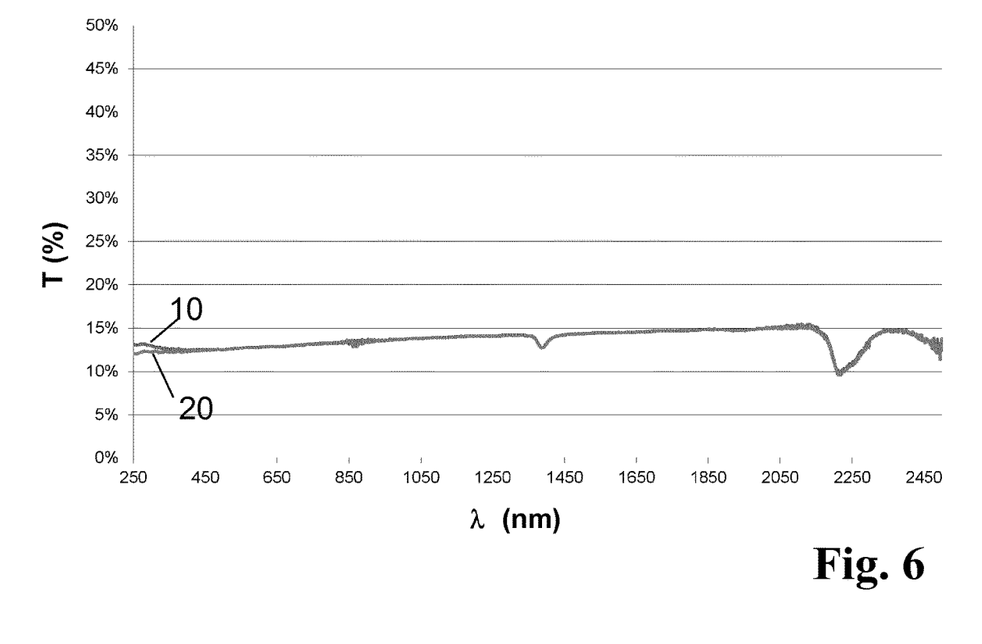

The diagrams of FIGS. 5 and 6 show the directional-hemispherical transmittance T (in %) measured by means of an integrating sphere on the diffuser plate 8 (thickness: 5 mm), against the wavelength range of 250 nm to 2500 nm.

All diagrams show two respective curves. These are substantially congruent, except for the UV wavelength range. The upper measurement curve designated there by reference numeral 10 respectively represents the measurement result prior to UV radiation of the measurement sample; the lower measurement curve 20 shows the profile after said irradiation. During irradiation the measurement samples were irradiated with a fivefold solar constant Sc. Sc designates the energy flux density of the sun per unit area and time perpendicular to the propagation direction at a mean Earth-Sun distance. It is about 1.366 W/m$^2$ and the total irradiation dose is 1.53×10$^7$ mJ/cm$^2$.

The diagrams of FIGS. 3 and 5 respectively show the measurement results on samples without hydrogen loading; the diagrams of FIGS. 4 and 6 show the measurement results on samples with hydrogen loading, as has been explained above.

It is discernible therefrom that the diffuser material in the measurement wavelength range has an approximately constant directional-hemispherical transmittance T of about 10-25%. The reflectance R is between 60% and 80% in this wavelength range. Regions of reduced reflection are found at a wavelength of 1400 nm and 2200 nm, which is due to absorption by hydroxyl groups. In the VUV range at wavelengths of about 250 mm the reflectance is 70% and thus higher than that of "Spectralon"®. After irradiation the measurement samples without hydrogen loading (FIGS. 3 and 5) show a distinct decrease both in reflectance R and transmittance T in the UV wavelength range. By comparison, the measurement curves of the samples with hydrogen loading (FIGS. 4 and 6) do not show this decrease or show it only to a considerably reduced degree. The induced absorption below 250 nm is caused by defect centers which can be healed by hydrogen.

Figure 7:
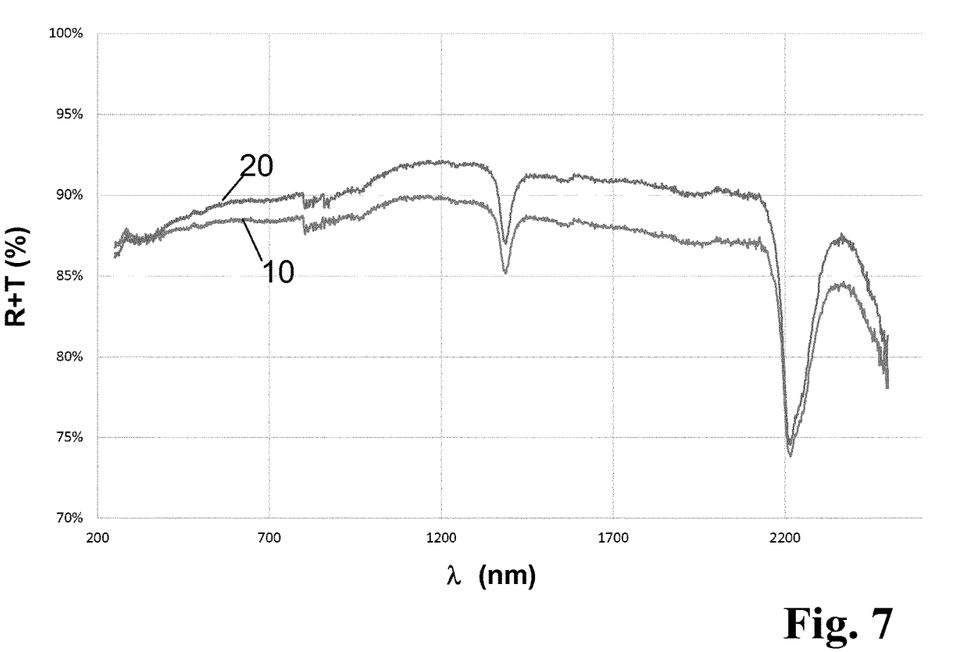
FIG. 7 shows a diagram on the spectral reflection and transmission behavior of the diffuser material of synthetically produced quartz glass.

A further sample of the diffuser material with the sample dimensions plate diameter=40 mm, plate thickness=7.5 mm was loaded with hydrogen on the basis of the above-explained method. The direct-hemispherical transmission "T" and the direct-hemispherical reflection "R" were measured on this sample over the wavelength range of 250 nm to 2500 nm. The measuring instrument of the company AZ Technology used therefor has the name "TESA 2000."

The diagram of FIG. 7 shows the spectral profile of the sum of the measured intensities of reflection and transmission (R+T); this type of representation is based on the following relationship of reflection R, transmission T and absorption A: R+T=100−A. This means that at the most the proportion missing at 100% of the irradiated radiation intensity is due to absorption in the diffuser material of the measurement sample.

The diagram contains two curves 10, 20. The measurement curve 10 represents the measurement result obtained before the UV irradiation of the measurement sample, as has been defined above in more detail (fivefold solar constant Sc); the measurement curve 20 represents the profile after this UV irradiation.

Apart from pronounced minima at about 1350 nm and 2200 nm, which are due to absorption by hydroxyl groups, both measurement samples over the wavelength range show a substantially constant intensity for R+T of much more than 80%, and even in the UV wavelength range of 250 nm to 300 nm more than 85%. The difference between the two curves 10 and 20 lies within an inaccuracy of ±1.5%. It can be ascribed to minor deviations during cleaning of the samples or to bleaching of defects after UV irradiation in the measurement sample 20.

The invention claimed is:

1. A diffuser material of pore-containing quartz glass with a chemical purity of at least 99.9% SiO$_2$, a cristobalite content of not more than 1%, and a density in the range of 2.0 to 2.18 g/cm$^3$, whereby at least 80% of the pores have a maximum pore dimension of less than 20 μm, wherein the quartz glass is produced synthetically, has a hydroxyl group content in the range of more than 200 wt. ppm, and contains hydrogen in a concentration in the range of 10$^{17}$ molecules/cm$^3$ to 10$^{19}$ molecules/cm$^3$.

2. The diffuser material according to claim 1, wherein the pore volume is in the range of 0.9 to 5%.

3. The diffuser material according to claim 1, wherein at least 80% of the pores have a maximum pore dimension of less than 10 μm.

4. The diffuser material according to claim 1, wherein the density distribution is homogeneous in the sense that five density measurement samples that are evenly distributed over a measurement length of 5 cm and have a sample volume of 1 cm$^3$ have a specific density range of less than 0.01 g/cm$^3$.

5. The diffuser material according to claim 1, wherein the pores contain neon.

6. The diffuser material according to claim 1, wherein the quartz glass has a hydroxyl group content of 450+/−50 wt. ppm.

7. The diffuser material according to claim 1, wherein the pore volume is in the range above 2.5%.

8. The diffuser material according to claim 2, wherein at least 80% of the pores have a maximum pore dimension of less than 10 μm.

9. The diffuser material according to claim 8, wherein the density distribution is homogeneous in the sense that five density measurement samples that are evenly distributed over a measurement length of 5 cm and have a sample volume of 1 cm$^3$ have a specific density range of less than 0.01 g/cm$^3$.

10. The diffuser material according to claim 2, wherein the pores contain neon.

11. The diffuser material according to claim 3, wherein the pores contain neon.

12. The diffuser material according to claim 4, wherein the pores contain neon.

13. The diffuser material according to claim 2, wherein the quartz glass has a hydroxyl group content of 450+/−50 wt. ppm.

14. The diffuser material according to claim 3, wherein the quartz glass has a hydroxyl group content of 450+/−50 wt. ppm.

15. The diffuser material according to claim 4, wherein the quartz glass has a hydroxyl group content of 450+/−50 wt. ppm.

16. A method for producing a molded body consisting at least in part of the synthetically produced diffuser material according to claim 1, in that a green body is produced from a slurry containing a dispersion liquid and $SiO_2$ powder particles with a purity of at least 99.9% $SiO_2$, and the green body is processed by sintering into the diffuser material, comprising the following method steps:

(a) providing a starting material of synthetically produced transparent quartz glass on the basis of a synthesis process which comprises the flame hydrolysis of a silicon-containing starting compound, wherein said starting material has a hydroxyl group content of more than 200 wt. ppm, and at a wavelength of 200 nm said starting material has an extinction coefficient k200 of less than $5 \times 10^{-3}$ cm$^{-1}$, (b) comminuting the starting material into $SiO_2$ grains, (c) wet grinding the $SiO_2$ grains in the dispersion liquid so as to form the slurry of the dispersion liquid and $SiO_2$ powder particles, of which the majority has a size of less than 10 µm, (d) molding the slurry into the green body of the $SiO_2$ powder particles, (e) sintering the green body at a sintering temperature below 1,400° C. so as to form the diffusor material, and (f) loading the diffuser material with hydrogen comprising a treatment at a pressure of at least 1 bar and at a temperature of less than 500° C. in a hydrogen-containing atmosphere.

17. The method according to claim 16, wherein components which decompose during sintering are added to the slurry.

18. The method according to claim 16, wherein sintering is carried out in a neon-containing atmosphere.

19. The method according to claim 16, wherein the starting material at a wavelength of 1064 nm has an absorption coefficient of 10 ppm/cm or less, and at a wavelength of 946 nm an absorption coefficient of 2000 ppm/cm or less.

20. A molded body consisting of a diffuser material according to claim 1 for use as a diffuser in spectroscopy and space applications, densitometer standards, remote sensing targets, laser cavities and laser reflectors, integrating spheres or as a cladding material for light sources.

* * * * *